July 12, 1966   L. E. SODERQUIST   3,260,782
PRESS FOR SHAPING AND CURING PNEUMATIC TIRES
Filed Feb. 3, 1964   5 Sheets-Sheet 1

INVENTOR.
LESLIE E. SODERQUIST
BY Hamilton & Cook
ATTORNEYS

INVENTOR.
LESLIE E. SODERQUIST
BY Hamilton & Cook
ATTORNEYS

July 12, 1966  L. E. SODERQUIST  3,260,782
PRESS FOR SHAPING AND CURING PNEUMATIC TIRES
Filed Feb. 3, 1964  5 Sheets-Sheet 5

INVENTOR.
LESLIE E. SODERQUIST
BY Hamilton & Cook
ATTORNEYS

United States Patent Office 3,260,782
Patented July 12, 1966

3,260,782
PRESS FOR SHAPING AND CURING
PNEUMATIC TIRES
Leslie E. Soderquist, Silver Lake, Ohio, assignor to McNeil Corporation, Akron, Ohio, a corporation of Ohio
Filed Feb. 3, 1964, Ser. No. 341,999
17 Claims. (Cl. 264—334)

The present invention relates to tire presses for shaping and curing unvulcanized tire bands having circular beads within opposed separable or relatively movable top or upper and bottom or lower mold sections or halves. More particularly, the invention relates to a permanent bag center mechanism carried by and extending axially from a mold section. The center mechanism shapes the tire band during closing of the mold sections, the tire band is cured when the mold sections are closed, and, while the press is opening by relative movement of the mold sections, the cured tire is stripped from the mold section carrying the center mechanism by selective and controlled increase of the diameter of a portion of the permanent bag which is between the tire beads or which is adjacent or near the opposed mold section.

Center mechanisms according to the present invention are intended for use in tire presses as shown in a number of prior art patents to the inventor, including United States Patent No. 2,808,618. Such presses are known to the industry as "Bag-O-Matic" type presses. The inventor's assignee, The McNeil Machine & Engineering Company, Akron, Ohio, is the manufacture of "Bag-O-Matic" presses and is the owner (by virtue of United States Trademark Registration No. 547,165) of all rights in the term when used as a trade name or trademark.

Presses manufactured according to United States Patent No. 2,808,618 have also been catagorized by certain parties active in this art as being a conventional watchcase type press, to distinguish the presses of Patent No. 2,808,618 from presses of the type wherein the press head and top mold section are carried vertically and laterally to expose the bottom mold section when such a press is opened.

Center mechanisms for a tire curing press according to the present invention have a permanent bag in the form of a deformable and radially distensible cylinder open at both ends. As shown, a center mechanism also includes a cylinder extending coaxially beneath a lower mold section. Within the cylinder is a lower piston carrying an elongate shaft extending upwardly above the lower mold section. A plate ring-clamp ring assembly carried on the projecting end of the piston shaft engages and closes the upper end of the permanent bag. These center mechanism elements as just described and their relation to a lower mold section are generally equivalent to elements disclosed in prior art patents of the inventor, such as United States Patent No. 2,808,618.

As shown, the novel elements of the center mechanism according to the present invention include a plate ring-bead ring assembly for clamping and closing the lower end of the permanent bag. The plate ring-bead ring assembly extends radially of the upper portion of the cylinder and is securely associated with the cylinder and with the lower mold section. Because, according to the concepts of the present invention, the lower plate ring-bead ring assembly is not elevated to strip a cured tire from the mold, the lower bead ring which is specially contoured to form the radially innermost portions of the lower bead of the cured tire may be integral with adjacent portions of the mold matrix. When the bead ring is mechanically integral with the adjacent mold the outer side of the bead area of the tire will not have a "rind" or flash.

Another advantage of the center mechanism according to the present invention is that the force or pressure to strip the cured tire from the mold section is applied radially outwardly against the bead area opposite to the bead area still in the mold. During the stripping operation, as the beads are spread apart, the diameter of the tread portion of the tire is reduced facilitating withdrawal from the mold matrix and reducing the possibility of what is known in the art as "hot tear." As shown, the novel elements of the present invention further include a second piston located in the cylinder above the first or lower piston. This upper piston carries a cylindrical sleeve coaxially enclosing the elongate shaft carried by the lower piston. Secured to the upper end of the sleeve is an actuator element which is received in an axial recess on the upper plate ring. Carried on the lower surface of the upper plate ring are a plurality of sectorial segments, which are engaged by the actuator element on the sleeve. As described in detail below, the first and second pistons are moved relative to each other within the cylinder to radially move the sectorial segments. When the segments are moved radially outwardly, the upper portion of the permanent bag will be effectively increased or expanded to a diameter in excess of the inner diameter of the bead areas of the cured tire. Upward movement of the expanded diameter portion of the permanent bag will apply pressure against the upper bead to strip the cured tire from the lower mold section.

The general object of the present invention is to improve the operating efficiency of presses for shaping and curing unvulcanized tire bands.

It is a specific object to provide a permanent bag center mechanism for a tire press of the "Bag-O-Matic" type wherein one of the assemblies engaging and closing the open ends of the bag remains stationary and integrally associated with the adjacent mold.

It is a further object to provide a center mechanism where a portion of the permanent bag may be selectively increased in diameter in a controlled manner for "pulling," rather than "pushing," the cured tire during the operation of stripping from the mold sections.

These and other objects of the invention, and additional advantages of the invention, will be apparent in view of the following detailed description and the attached drawings.

General description

Figure 1:
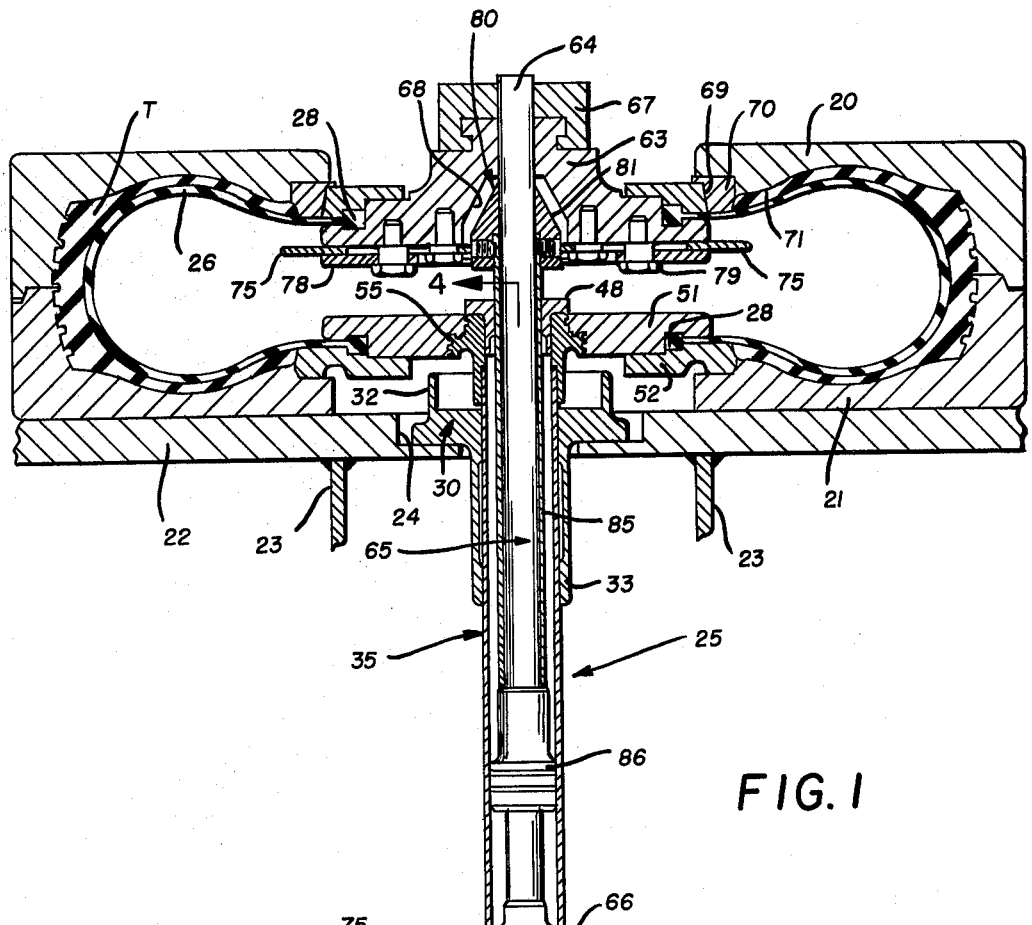
FIG. 1 is an elevation, partly in section, showing the press mold sections in the closed or curing position and the improved center mechanism in position for opening of the press and stripping of the cured tire from a lower mold section.

A tire curing press suitable for practice of the invention has separable upper and lower mold sections, 20 and 21. The upper or movable mold sections 20 are carried on and suitably attached to the under side of a conventional heavy cross beam (not shown) which extends across the press and constitutes one of the links of the operating mechanism by which the press is opened or closed. The lower or stationary mold sections 21 are mounted on conventional platens attached to the base plate of the press frame 23. Extending axially through the mold section 21, the platen 22 and the base plate and down into the press frame is a passage or well, indicated at 24, accommodating the lower portion of the improved center mechanism, indicated generally at 25.

Press elements 20–24, described above, are shown in a number of prior art patents to the inventor, including United States Patent No. 2,808,618 identified above, to which reference is made for such details of presses as are required to more fully understand the invention.

The permanent bag, bladder or diaphragm 26 of an improved center mechanism is an elongate, deformable, radially distensible but heavy walled cylinder open at both the upper and lower ends. The bag 26 is manufactured from rubber, rubberized fabric or similar suitable materials known to the art, in a bag mold. It is preferred that the bag mold be designed so that the finished bag though cylindrical is also somewhat barrel shaped; that is, has a slightly enlarged medial portion so that the bag in use and when elongated (the condition of FIG. 3) will collapse in four or more convolutions or folds.

Referring to the drawings, the side wall 27 of the bag is of substantially uniform thickness. The exterior surface of the side wall 27 may be suitably ribbed, grooved or engraved in a known manner to facilitate exhaust of entrapped air between the tire band and the expanding bag during shaping. The end portions 28 of the bag are suitably shaped for secure engagement by the clamping and closing assemblies described in detail below.

Figure 4:
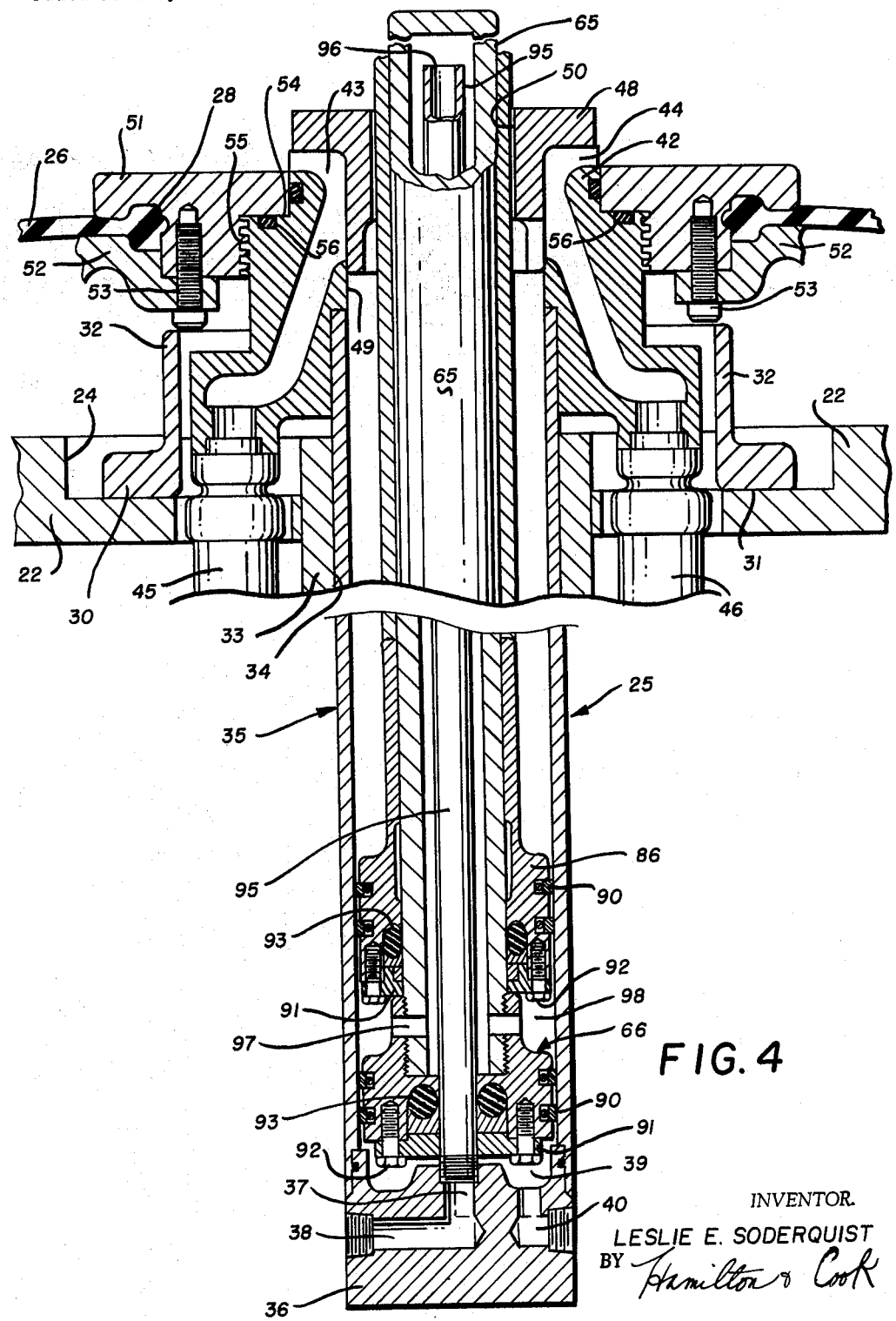
FIG. 4 is an enlarged fragmentary section, taken substantially as indicated on line 4—4 of FIG. 1, showing details of the lower portion of the improved center mechanism.

As best shown in FIG. 4, the center mechanism 25 is mounted axially of the lower mold section by a support member 30 attached to the press frame as at 31 and extending downwardly through the press base well 24. The upper end of the support member 30 has a peripheral flange 32 for registering and centering the press platen 22 and the lower mold. Within the press base the support member 30 has an axial stem portion 33 with a bore 34 receiving and holding the primary stationary member or cylinder 35 of the center mechanism.

The lower end of the cylinder 35 is closed by a cap 36 having an axial fluid pressure passage or bore 37 supplied by a lateral passage or bore 38. The cap 36 also has a circular fluid pressure passage or chamber 39 supplied by a radially offset passage or bore 40. Pressure fluid is supplied through suitable conduits or lines (not shown) to the passages 38 and 40 for actuation of pistons within the cylinder 35, as described in detail below.

Attached to and carried on the upper portion of cylinder 35, extending above the bore 34 in the support member 30, is a pressure fluid manifold 42. The manifold 42 is a central member extending radially of the cylinder 35 and has preferably opposed pressure fluid chambers 43 and 44. The upper end of each chamber 43 and 44 opens into the interior of a bag 26. The lower end of chamber 43 is suitably adapted for connection to a service line 45. For purpose of disclosure, line 45 is considered as being the conduit communicating with the selectively valved press service line (not shown) for connection to drain. The lower end of chamber 44 is similarly adapted for connection to a service line 46. Line 46 is considered as being the connection for communication with the selectively valved press service lines (not shown) for connection to sources for vacuum, shaping media and curing media, or, if desired, also to drain.

The upper end of the cylinder 35 is closed by a hub member 48 which may be securely received in an axial bore 49 in the manifold 42. The hub member 48 has an axial bore 50 for slidably receiving the longitudinally movable cylindrical sleeve and elongate shaft carried by the pistons within the cylinder 35, all as described in detail below.

The lower end of the bag 26 is closed axially of the lower mold section 21 by an assembly of a plate ring 51 and a bead ring 52 having suitably shaped circular grooves for clamping and closing the end portion 28 of the bag. For the purpose of bag change or replacement, the plate ring may be removably attached to the bead ring as by a series of bolts 53.

The plate ring 51 is a circular member having a diameter less than the smallest diameter of an uncured tire band or a cured tire. The plate ring 51 is adapted for mounting radially of the upper portion of the cylinder 35. As shown, the plate ring has an axial bore for mounting on the manifold 42, below the openings for the fluid chambers 43 and 44 into the interior of the bag 26. As best seen in FIG. 4, the axial bore of the plate ring 51 has an upper shoulder or shelf 54 and a lower continuous internal thread 55 for accurate positioning and secure attachment to corresponding portions on the radially outer surface of the manifold 42. It is preferred that the mating portions of the plate ring and manifold be fitted with suitable fluid seals such as the O-rings indicated at 56.

The bead ring 52 is a circular member having a diameter slightly greater than the diameter of the plate ring and a radially outer portion 57 which is specially contoured to form a bead area of the tire during shaping and curing. Axially of portion 57 the bead ring 52 may have another circumferential portion 58 machined or shaped as required to provide a high tolerance or close fit with the adjacent molding surfaces or matrix 59 of the mold section 21.

As used in certain of the claims set forth below, the term "second assembly" refers to the assembly of a plate ring 51 and a bead ring 52 but is not intended to be limited to the disclosure of elements 51 and 52 as being mounted so as to be integrally associated with only a lower mold section 21.

The upper end of the bag 26 is closed by an assembly of a plate ring 61 and a clamp ring 62 having suitably shaped circular grooves for engaging and closing the end portion 28 of the bag. For the purpose of bag change or replacement, the clamp ring 62 may be removably attached to the plate ring 61 by any suitable means.

The plate ring 61 is a circular member having a diameter less than the smallest diameter of an uncured tire band or a cured tire; preferably having the same diameter as the lower plate ring 51. The plate ring 61 has a hub portion 63 with an axial bore. The axial bore through the plate ring hub 63 has an upper portion for securely receiving the end portion 64 of an elongate shaft 65 projecting from the cylinder 35 and carried by a piston 66. The projecting piston shaft end 64 may be positively attached to the plate ring 61 by a coupling member 67. The axial bore through the plate ring hub 63 also has an enlarged recess portion 68 to accommodate or enclose an actuator element for increasing the diameter of the bag 26 during the stripping operation, as described in detail below.

The clamp ring 62 is a circular member having a diameter which is preferably less than the smallest diameter of an uncured tire band. Referring to FIG. 1, the radially outer portion 69 of the clamp ring is suitably machined or shaped to be received within the bore of a bead ring 70 especially contoured to form the bead area of the tire during shaping and curing. The bead ring 70 is mechanically integral with the adjacent molding surfaces 71 of the mold section 20.

As used in certain of the claims set forth below, the term "first assembly" refers to the assembly of a plate ring 61 and a clamp ring 62 but is not intended to be limited to the disclosure of elements 61 and 62 as being mounted so as to be movably associated with only a bead ring 70 of an upper mold section 20.

Figure 5:
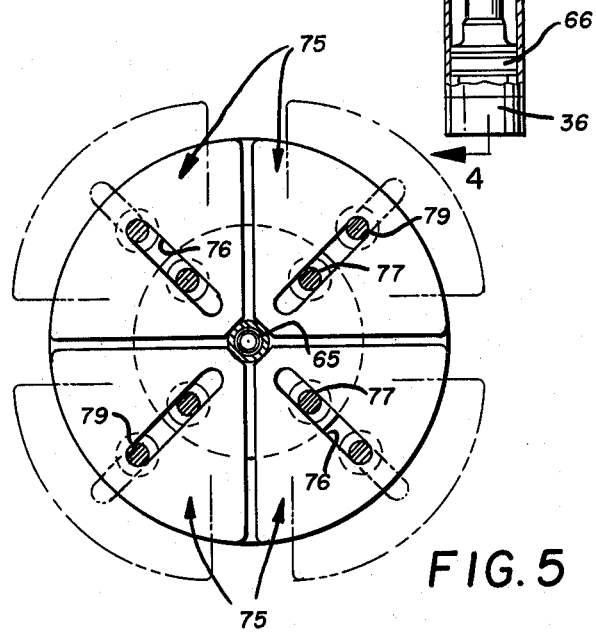
FIG. 5 is a plan view showing details of the sectorial segments carried by a permanent bag clamping and closing assembly.

Referring to the first sheet of drawings (FIGS. 1 and 5) adjacent the under surface of the plate ring 61 are a plurality of radially movable elements or sectorial segments 75. When moved radially outwardly, the sectorial segments 75 will increase or expand the diameter of the bag 26 to a dimension greater than the smallest diameter dimension (as shown by the chain lines in FIG. 5) of a cured tire. The movement of each segment is guided by a radially exending track or means such as an elongate slot 76 and a guide pin 77 inserted through a slot into the plate ring 61. The segments 75 are retained and stabilized in relation to the plate ring 61 by a circular ring member 78 held by a series of bolts and washers 79 inserted into the plate ring slot 76.

As shown, there are four segments 75 each being generally pie-sliced shaped. However, the number of segments could vary so long as each segment has a track means such that the segments may be moved outwardly interiorly of or within the bag 26, to establish an "effective diameter" sufficient to accomplish the tire stripping operation.

The segments 75 may be moved radially outwardly to expand the bag 26 of the center mechanism by an actuator means or element 80 carried axially of the cylinder 35 and movable longitudinally in relation to the elongate shaft 65. As shown, the actuator 80 is a plug or bullet-shaped member having a conical upper surface 81 for sliding contact with the radially inner ends of the segments 75. The lower surface 82 of the actuator 80 is uniformly cylindrical, having a predetermined diameter in relation to the segments 75. The actuator 80 is secured as by recessed screws 83 on the end of a cylindrical sleeve 85 carried by a piston 86 within cylinder 35, above the first or lower piston 66. The sleeve 85 slidably encloses a portion of the elongate shaft 65 and is movable longitudinally thereof as described next below.

Referring to FIG. 4, this view shows an embodiment of the invention in which the first or lower piston 66 and the second or upper piston 86 are actuated and moved longitudinally within the cylinder 35 and in relation to each other by pressure fluid supplied through the bores 38 and 40 in the end cap 36. Each piston may have peripheral sealing rings 90, a wear plate 91 secured by bolts 92 and peripheral fluid pressure seals or O-rings 93.

The fluid pressure for actuation of the first piston 66 is supplied to the circular passage 39 from bore 40. Pressure for actuation of the second piston 86 is supplied to the axial passage 37 from bore 38. Threaded into the upper end of bore 37 is a hollow stationary tube 95 which extends axially upwardly through the movable piston 66 and elongate shaft 65. The length of the pressure supply tube 95 is such or sufficient that when the piston 66 is moved away from the cylinder end cap 36, the upper end 96 of the tube will open into the shaft 65 above the lower piston 66. As shown in FIG. 4, pressure fluid from the tube end 96 passes through radial ports 97 in the shaft 65 or the piston 66 into a circular fluid pressure passage or chamber 98 between the pistons 66 and 86.

Figure 6:
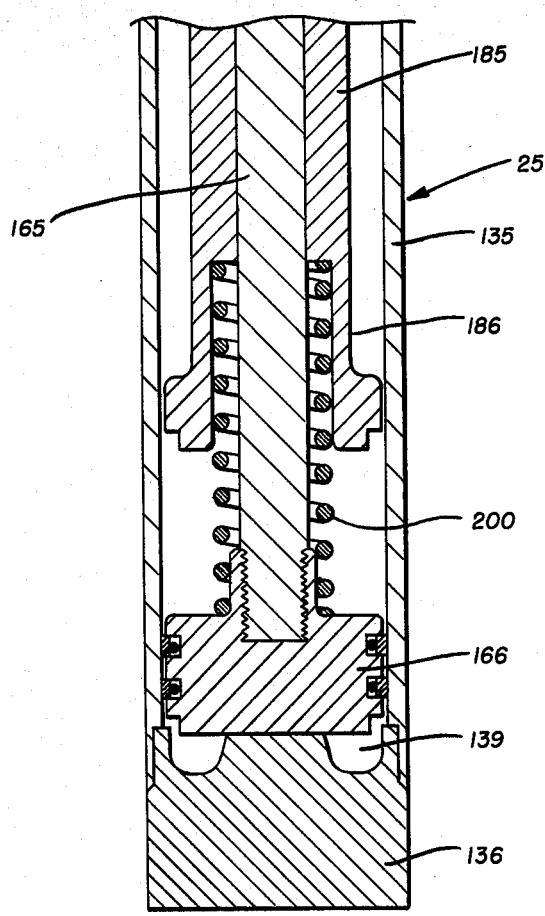
FIG. 6 is a view similar to FIG. 4 showing a modification of the lower portion of the center mechanism.

Referring to FIG. 6, in an alternative embodiment for a center mechanism 25, a cylinder 135 confines a first or lower piston 166 and a second or upper piston 186. The lower piston 166 is actuated by fluid pressure introduced into an end cap 136 through suitable conduits (not shown) to a circular fluid pressure passage or chamber 139. The upper piston 186 carries a cylindrical sleeve 185 and is maintained in position relative to the lower piston 166 during the operations of the center mechanism, by the compression forces of a coiled spring 200 which coaxially surrounds a solid elongate shaft 165 carried by piston 166.

*Press operation*

Referring to FIG. 1, when the press mold sections are closed the center mechanism is in curing relation to a tire T, the bag 26 is radially distended within the shaping and curing tire, and curing media is being introduced through manifold chamber 44 and service line 46. The first piston 66 is located near the cylinder end cap 36 by the contact of the upper clamp ring 62 with the upper mold section bead ring 70. The second piston 86 has moved away from the lower piston 66 until the actuator 80 is received in the recess 68 in the hub portion of the upper plate ring 61.

In the cylinder 35, as shown in FIG. 4, the FIG. 1 position of the upper piston 86 is reached by the introduction of pressure fluid into the end cap bore 38, which is supplied internally of the cylinder 35 through the several conduits described above. In the cylinder 135 as shown in FIG. 6, the FIG. 1 position of the upper piston 186 is reached by the expansive forces of the compression spring 200. In either form of the invention, in the FIG. 1 position the sectorial segments 75 have been radially expanded within the bag 26.

At the end of the curing period, the press is actuated by a suitable control means, such as a timer (not shown) to begin to open. Prior to opening, the press control means has cut off supply of curing media to manifold chamber 44, and has opened the valve in line 45 in connecting the manifold chamber 43 to drain.

Figure 2:
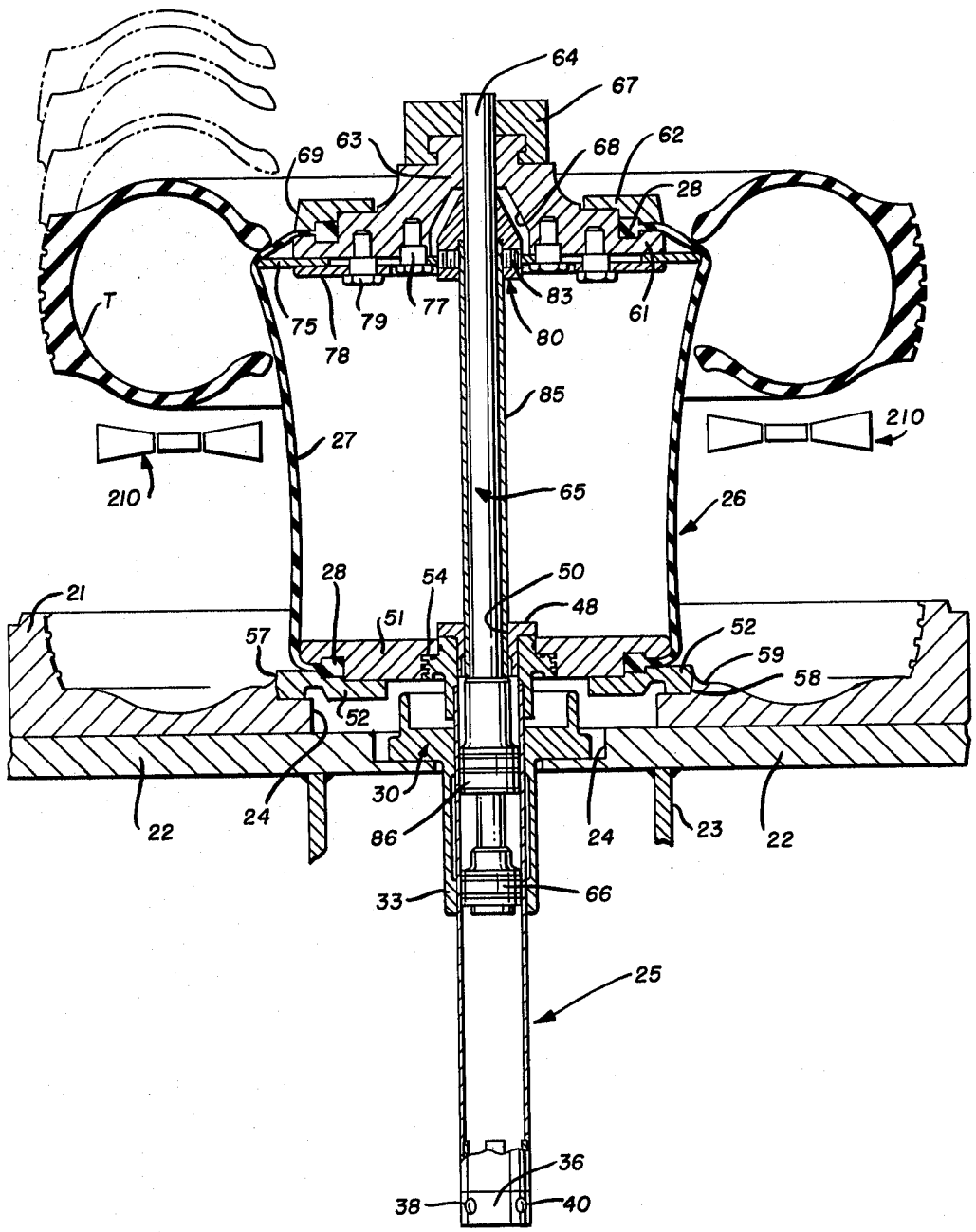
FIG. 2 is an elevation, partly in section, sequential to FIG. 1 and showing the press opened and the cured tire after having been stripped from the lower mold by the center mechanism.

As the press opens, the center mechanism 25 is operated to strip the cured tire T from the lower mold section 21 and to position the tire as shown in FIG. 2 for engagement by suitable apparatus for discharge of the tire from the press. The lifting arms of a tire discharge mechanism are indicated generally at 210. Details of a suitable mechanism for moving the lifting arms 210 for removal or discharge of the tire from the press have not been shown herein; reference being made to prior art patents of the inventor, including United States Patents No. 2,832,991, No. 2,832,992, and No. 2,911,670, and copending United States application Serial No. 98,854, filed March 28, 1961, for such details of suitable mechanisms as are required to more fully understand the invention.

Referring still to FIG. 2, while the press is opening by relative movement of the mold sections, the shaft 65-piston 66 and the sleeve 85-piston 86 are moved together and raised within cylinder 35.

According to the FIG. 4 disclosure, the simultaneous movement of the first and second pistons may be accomplished by closing a valve in the supply line to the end cap bore 38 to maintain the pressure in chamber 98 and introducing pressure into the end cap bore 40 which is supplied to the passage 39 to raise the first or lower piston 66. The rate at which the lower piston 66 is raised between the positions of FIG. 1 and FIG. 2 is preferably controlled by maintaining contact of the upper clamp ring 62 with at least a portion of the upper mold section bead ring 70 during initial press opening. Alternatively, the lower piston 66 could be raised by a valve-controlled introduction of pressure into the end cap bore 40, coordinated with the rate of press opening movement.

In the cylinder 135 as shown in FIG. 6, the mechanical resistance provided by the compression spring 200 will maintain the relative positions of the shaft 165-piston 166 and the sleeve 185-piston 186, while the lower piston 166 is actuated by pressure fluid.

Figure 3:
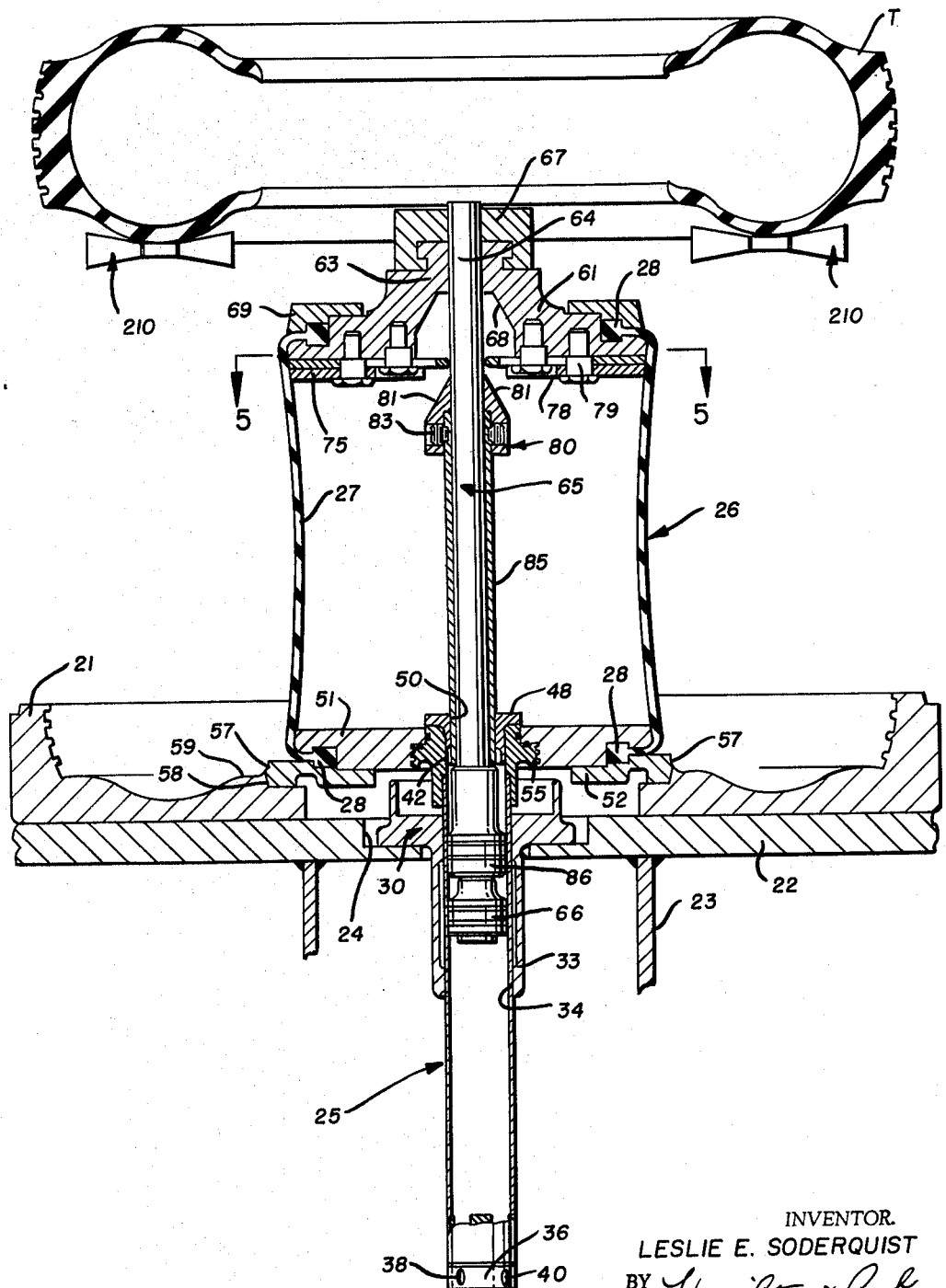
FIG. 3 is still another elevation, partly in section, sequential to FIG. 2 and showing the permanent bag of the center mechanism fully elongated and the cured tire in position for discharge from the press.

After the cured tire T is stripped from the mold and ready for discharge from the press by the lifting arms 210, the center mechanism 25 will be in the condition of FIG. 3. The bag 26 is fully elongated and the effective diameter decreased by raising the lower piston 66 until contact with the upper piston 86. The shaft 65 is also raised, moving the actuator 80 on sleeve 85 longitudinally away from the plate ring recess 68. When the actuator 80 is not in or is out of contact with the segments 75, the normal or inherent resiliency of the bag 26 will cause the segments to collapse or move radially inwardly to their smaller diameter position and the effective diameter of the entire bag will be decreased to the diameter of the plate rings 51 and 61.

According to the FIG. 4 disclosure, the final movement of the shaft 65-piston 66 relative to the sleeve 85-piston 86 during elongation of the bag of the center mechanism 25, may be accomplished by opening a valve in the supply line to the end cap bore 38 to release the pressure in chamber 98 while continuing the introduction of pressure into the end cap bore 40. In the cylinder 135 as shown in FIG. 6, sufficient pressure in chamber 139 would be supplied to compress the spring 200 normally separating the upper piston 186 and lower piston 166.

The above description and accompanying drawings are considered sufficient to enable one skilled in the art to understand the principles and workings of the press and center mechanism 25 according to the invention. However, it will be appreciated that the details are not essential and may be modified or varied, as in the embodiments disclosed, within the scope of the advance in the art and the appended claims. Further, while the invention has been shown and described in connection with one pair of mold halves or sections, the principles thereof could be used in dual presses. Also, no showing has been made of any wiring diagram and switches by which closing and opening of the press, admission of the shaping and curing media, circulation of air or application of vacuum to the bag interior, introduction of pressure fluid into the cylinder 35, etc., may be automatically controlled, since such details may be readily designed by any qualified electrical engineer when the sequence of operations as described herein is understood.

What is claimed is:

1. A method for removing a cured tire from a press having opposed separable mold sections and a permanent bag center mechanism carried by and extending axially of one of the mold sections, comprising, opening the press by relative movement of the mold sections, stripping the cured tire from the mold section carrying the center mechanism by increasing the effective diameter of that portion of the bag which is adjacent the opposed mold section, and discharging the cured tire after decreasing the effective diameter of the entire bag.

2. A method for removing a cured tire from a press having separable upper and lower mold sections and a permanent bag center mechanism carried axially of the lower mold section and extending toward the upper mold section, comprising, opening the press by moving the upper mold section away from the lower mold section, stripping the cured tire from the lower mold section by increasing the effective diameter of that portion of the bag which is adjacent the upper mold section, and discharging the cured tire from above the bag after decreasing the effective diameter of the bag.

3. A method for removing a cured tire having circular beads from a press having opposed separable mold sections and a permanent bag center mechanism carried by and extending axially of one of the mold sections, said tire being cured when said mold sections are closed and the bag of said center mechanism is substantially radially distended between the beads of the tire, comprising, opening the press by relative movement of the mold sections, maintaining the diameter of a portion of the bag of said center mechanism which is between the beads of the tire at a dimension greater than the diameter of the beads of the tire whereby said tire is stripped from the mold sections, and discharging the cured tire after decreasing the diameter of the entire bag to a dimension less than the diameter of the beads of the tire.

4. A method for removing a cured tire having circular beads from a press having separable upper and lower mold sections and a permanent bag center mechanism carried axially of the lower mold section and extending toward the upper mold section, said tire being cured when said mold sections are closed and the bag of said center mechanism is substantially radially distended between the beads of the tire, comprising, opening the press by moving the upper mold section away from the lower mold section, maintaining the diameter of a portion of the bag which is between the beads of the tire at a dimension greater than the diameter of the beads of the tire whereby said tire is stripped from the mold sections, and discharging the cured tire from above the bag after decreasing the diameter of the entire bag to a dimension less than the diameter of the beads of the tire.

5. In a press for the shaping and curing of tires and having opposed separable mold sections and a permanent bag center mechanism, the bag of said center mechanism being a deformable and radially distensible cylinder open at both ends, a stationary member located axially of one of said mold sections and extending away from both of said mold sections, an elongate shaft extending toward the opposed mold section from within said stationary member, a first assembly carried on the projecting end of said shaft for closing one end of said bag, a second assembly extending radially of said stationary member for closing the other end of said bag, a sleeve enclosing a portion of said shaft exteriorly of said bag, radially movable elements carried on the surface of said first assembly which is facing the second assembly and interiorly of said bag, and actuator means on said sleeve for selectively moving said radially movable elements to increase the effective diameter of that portion of said bag adjacent the first assembly.

6. In a press for the shaping and curing of tires and having opposed separable mold sections and a permanent bag center mechanism, the bag of said center mechanism being a deformable and radially distensible cylinder open at both ends, a stationary member located axially of one of said mold sections and extending away from both of said mold sections, an elongate shaft extending toward the opposed mold section from within said stationary member, a first assembly carried on the projecting end of said shaft for closing one end of said bag, a second assembly extending radially of said stationary member for closing the other end of said bag, a sleeve enclosing a portion of said shaft exteriorly of said bag, radially movable elements carried on the surface of said first assembly which is facing the second assembly and interiorly of said bag, an actuator on said sleeve for selectively contacting said radially movable elements, and means to move said sleeve relative to said shaft whereby said actuator moves the radially movable elements to increase the effective diameter of that portion of said bag adjacent the first assembly.

7. In a press according to claim 6, a sleeve enclosing a portion of said shaft from within said stationary member and means within said stationary member to move said sleeve relative to said shaft whereby said actuator moves the radially movable means to increase the effective diameter of that portion of said bag adjacent the first assembly.

8. In a press for the shaping and curing of tires and having separable upper and lower mold sections and a permanent bag center mechanism, the bag of said center mechanism being a deformable and radially distensible cylinder open at both ends, a stationary member extending axially of and beneath a lower mold section, an elongate shaft extending toward the upper mold section from within said stationary member, a first assembly carried on the projecting end of said shaft for closing the upper end of said bag, a second assembly extending radially of said stationary member for closing the lower end of said bag, a sleeve enclosing a portion of said shaft interiorly of said bag, radially movable elements carried on the under surface of said first assembly and interiorly of said bag, and actuator means on said sleeve for selectively moving said radially movable elements to increase the effective diameter of that portion of said bag adjacent the first assembly.

9. In a press for the shaping and curing of tires and having separable upper and lower mold sections and a permanent bag center mechanism, the bag of said center mechanism being a deformable and radially distensible cylinder open at both ends, a stationary member extending axially of and beneath a lower mold section, an elongate shaft extending toward the upper mold section from within said stationary member, a first assembly carried on the projecting end of said shaft for closing the upper end of said bag, a second assembly extending radially of said stationary member for closing the lower end of said bag, a sleeve enclosing a portion of said shaft interiorly of said bag, radially movable elements carried on the under surface of said first assembly and interiorly of said bag, an actuator on said sleeve for selectively contacting said radially movable elements, and means to move said sleeve upwardly of said shaft whereby said actuator contacts the radially movable elements to increase the diameter of that portion of said bag below the first assembly.

10. In a press according to claim 9, a sleeve enclosing a portion of said shaft upwardly from within said stationary member and means within said stationary member to move said sleeve upwardly of said shaft whereby said actuator contacts the radially movable means to increase the diameter of that portion of the bag below the first assembly.

11. In a press for the shaping and curing of tires and having opposed separable mold sections and a permanent bag center mechanism, the bag of said center mechanism being a deformable and radially distensible cylinder open at both ends, a cylinder located axially of one of said mold sections and extending away from both of said mold sections, a first piston in said cylinder, an elongate shaft carried by said first piston and extending toward the opposed mold section, a first assembly carried on the projecting end of said shaft for closing one end of said bag, a second assembly mounted radially of said cylinder and integrally associated with the adjacent mold section for closing the other end of said bag, a second piston in said cylinder between said first piston and said second assembly, a sleeve carried by said second piston and enclosing a portion of said shaft, radially movable elements carried on the surface of said first assembly which is facing the second assembly, an actuator on said sleeve for selectively contacting said radially movable elements, and force means applied in said cylinder between said first and second pistons to move said sleeve relative to said shaft whereby said actuator moves the radially movable elements to increase the effective diameter of that portion of said bag adjacent the first assembly.

12. In a press according to claim 11, a fluid pressure force means applied in said cylinder between said first and second pistons to move said sleeve relative to said shaft whereby said actuator moves the radially movable elements to increase the effective diameter of that portion of said bag adjacent the first assembly.

13. In a press according to claim 11, a compression spring force means applied in said cylinder between said first and second pistons to move said sleeve relative to said shaft whereby said actuator moves the radially movable elements to increase the effective diameter of that portion of said bag adjacent the first assembly.

14. In a press for the shaping and curing of tires and having separable upper and lower mold sections and a permanent bag center mechanism, the bag of said center mechanism being a deformable and radially distensible cylinder open at both ends, a cylinder extending axially of and beneath a lower mold section, a lower piston in said cylinder, an elongate shaft carried by said lower piston and extending toward the upper mold section, a plate ring-clamp ring assembly carried on the projecting end of said shaft for closing the upper end of said bag, said upper plate ring being beneath said clamp ring and having an axial recess, a plate ring-bead ring assembly mounted radially of said cylinder for closing the lower end of said bag, said bead ring being integrally associated with said lower mold section, an upper piston in said cylinder above said lower piston, a sleeve carried by said upper piston and enclosing a portion of said shaft, a plurality of sectional segments carried by track means attached to the under surface of said upper plate ring and movable toward and away from said axial recess, an actuator on the upper end of said sleeve and movable longitudinally into said recess and into contact with said segments whereby said segments are moved radially outwardly within the bag, and means to move said sleeve upwardly relative to said shaft to increase the effective diameter of that portion of the bag adjacent the upper plate ring.

15. A center mechanism for a tire press having opposed separable mold sections, comprising, a deformable radially distensible cylindrical bag open at both ends, opposed first and second assemblies one for closing each end of said bag, said first assembly being movable longitudinally of said second assembly, said second assembly being integrally associated with a mold section, radially movable elements carried on the surface of said first assembly facing said second assembly and interiorly of said bag, and an actuator element interiorly of said bag for selectively moving said radially movable elements to increase the effective diameter of that portion of the bag adjacent the first assembly.

16. A center mechanism for a tire press having opposed separable mold sections, comprising, a deformable radially distensible cylindrical bag open at both ends, opposed first and second assemblies one for closing each end of said bag, said first assembly being movable longitudinally of said second assembly, said second assembly being integrally associated with a mold section, a plurality of sectorial segments carried by a track means attached to the surface of said first assembly facing said second assembly, and an actuator element movable interiorly of said bag for selectively moving said segments radially outwardly to increase the effective diameter of that portion of the bag adjacent the first assembly.

17. A center mechanism for a tire press having separable upper and lower mold sections, comprising, a deformable radially distensible cylindrical bag open at both ends, a lower plate ring-bead ring assembly for closing the lower end of said bag, said bead ring being integrally associated with a lower mold section, an upper plate ring-clamp ring assembly for closing the upper end of said bag and being mounted for movement longitudinally of said lower assembly, radially movable elements carried on the under surface of said upper assembly and interiorly of said bag, and an actuator element interiorly of said bag for selectively moving said radially movable elements to increase the effective diameter of that portion of the bag adjacent the first assembly.

References Cited by the Examiner

UNITED STATES PATENTS

| 2,997,738 | 8/1961 | Soderquist | 18—2 |
| 3,097,394 | 7/1963 | Mallory | 18—2 |
| 3,153,263 | 10/1964 | Mallory | 18—2 |

ROBERT F. WHITE, *Primary Examiner.*

R. B. MOFFITT, *Assistant Examiner.*